United States Patent [19]

Lennon

[11] 3,749,411
[45] July 31, 1973

[54] SHAFT SEALING SYSTEM
[75] Inventor: John J. Lennon, Winchester, Mass.
[73] Assignee: Nettco Corporation, Everett, Mass.
[22] Filed: July 19, 1971
[21] Appl. No.: 163,824

[52] U.S. Cl............................ 277/2, 277/15, 277/28
[51] Int. Cl........................... F16j 15/34, F16j 15/40
[58] Field of Search ..................... 277/2, 15, 22, 28; 116/118

[56] References Cited
UNITED STATES PATENTS
| | | | |
|---|---|---|---|
| 3,489,419 | 1/1970 | Stratienko | 277/15 |
| 3,106,099 | 10/1963 | Jeffrey et al. | 277/15 |
| 3,115,347 | 12/1963 | Lennon | 277/59 |
| 3,392,983 | 7/1968 | Hajner | 277/28 |
| 3,441,048 | 4/1969 | Finnegan | 137/392 |

FOREIGN PATENTS OR APPLICATIONS
687,120   2/1953   Great Britain ....................... 277/15

Primary Examiner—Samuel B. Rothberg
Attorney—Cesari & McKenna

[57] ABSTRACT

A shaft sealing system employs a conventional liquid barrier unit to prevent leakage of gases between the shaft and its support. The system also includes a chamber positioned above the unit and communicating with it. When the unit is filled with barrier liquid, the liquid level in the chamber is at an upper location thereon. However, when the liquid supply in the unit is depleted, the level in the chamber drops appreciably indicating a gas leak in the sealing system.

5 Claims, 1 Drawing Figure

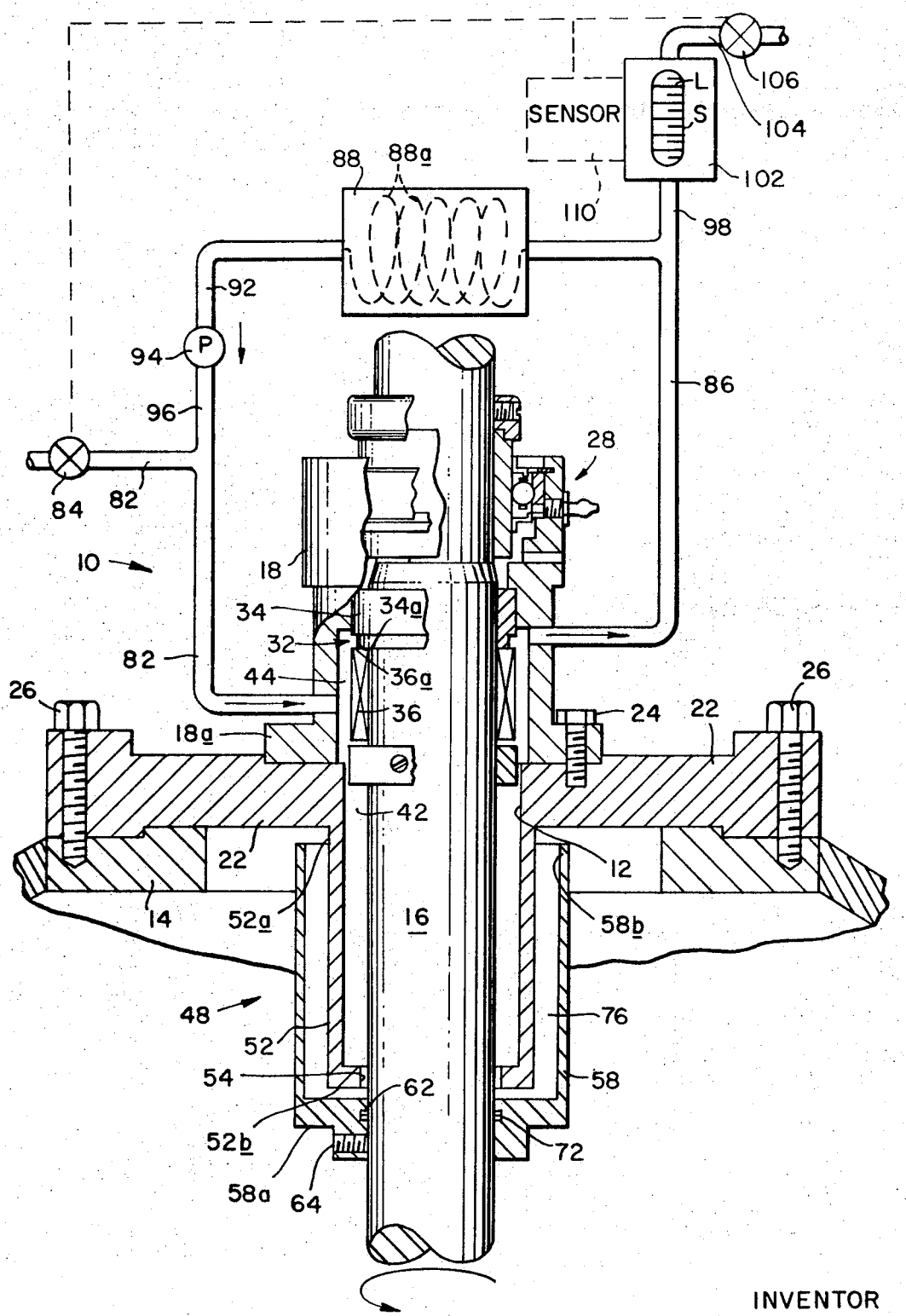

SHAFT SEALING SYSTEM

BACKGROUND OF THE INVENTION

This invention relates to shaft seals. It relates more particularly to a sealing system of the type which employs a fluid barrier to augment the properties of a conventional rotary seal.

A shaft seal is used to prevent leakage along a shaft that extends into an enclosure through a wall thereof. Such seals are used, for example, in industrial mixers between the tanks carrying the materials to be mixed and the rotary impeller shafts which extend into the containers. The seals prevent the fluids in the container from leaking out through the joints between the shafts and the container walls.

A shaft seal that is often used when high sealing performance is needed is a single mechanical seal of the "rotary" or "radial" type. In a seal of this type, an annular member affixed to the shaft and a stationary annular member affixed to the container wall engage each other along a radial plane, the seal being effected at the engaging surfaces of the two members. Even this seal, however, is unable to completely eliminate leakage of a gas under pressure. Also, the seals are sometimes damaged by solids entrained in the gas in the tank.

In such cases, highly effective sealing may nevertheless be provided by using the liquid barrier arrangement disclosed in U.S. Pat. No. 3,115,347. This system employs a pair of concentric cups arranged coaxially with the shaft and through which the shaft extends. The outer cup is connected to rotate with the shaft, the inner cup is stationary, its rim being connected to the top wall of the tank. The spaces between the two cups and between the inner cup and the shaft are filled with a barrier liquid. This liquid provides a gastight seal, while still allowing the shaft and the outer cup to rotate relative to the support and its cup. In turn, a rotary seal above the cups prevents leakage of the barrier liquid. Usually, also, means are provided for replenishing the barrier liquid in the seal so that the system is completely full at all times.

While a sealing system of the above type works quite satisfactorily when filled with the proper amount of barrier liquid, sometimes the barrier liquid escapes due to evaporation or due to the motion of the shaft. When a substantial portion of the liquid does escape, the system no longer provides an effective gas seal.

Until now, there has been no sure way of determining whether or not the liquid barrier is filled with the proper amount of the liquid. The rate at which the liquid escapes is determined in large part by the conditions of use of the associated apparatus. As these factors may constantly change, one cannot determine empirically the amount of barrier liquid which should be added at any given time or how often. Consequently, maintenance personnel sometimes add the liquid too seldom or in insufficient amount, with the result that the supply is soon depleted and leaks occur. In the case of industrial mixers, this may result in the release of noxious or dangerous fumes, with consequent injury to attending personnel.

SUMMARY OF THE INVENTION

Accordingly, this invention aims to provide an improved fluid-mechanical shaft sealing system.

A further object of the invention is to provide a sealing system of this type wherein the amount of barrier liquid can be monitored at all times.

Another object of the invention is to provide a fluid-mechanical shaft sealing system in which the barrier liquid can be replenished automatically as needed.

Yet another object is to provide a sealing system of this type which minimizes downtime of associated apparatus.

Other objects will in part be obvious and will in part appear hereinafter.

Briefly, my system employs a liquid barrier of the type described above. It also includes a cooling and recirculation unit for the barrier liquid. These units are commonly used to remove heat from the barrier liquids which would otherwise be subjected to unduly high temperatures. They are closed loop systems containing external heat exchangers and pumps for circulating the liquids through the heat exchangers.

In order to assure that the barrier is properly filled with barrier liquid, I provide an indicator at the highest point in the barrier liquid circulation loop. In its simplest form, this indicator takes the form of a sight glass extending up from the top of the loop. If the barrier is properly filled with barrier liquid, the liquid level should lie near the top of the sight glass. On the other hand, if, for some reason, the level of the barrier liquid falls to the point where the liquid barrier loses its effectiveness, gas will enter the circulation loop and migrate to the sight glass. This permits the level of liquid in the sight glass to drop so that it readily becomes apparent to the observer that enough barrier liquid has been lost from the liquid barrier to break its seal. The operator may then simply open the valve from a barrier liquid supply while venting the sight glass, allowing more liquid to flow into the barrier until the liquid level rises to the proper point on the sight glass. In a more elaborate system, the fall of liquid in the glass may actuate a remote alarm through a switch device responsive to the absence of liquid.

Of course, in some applications, the barrier liquid can be replaced automatically as needed. In this event, the sight glass is replaced by a sensor responsive to the level of the liquid sealant and the inlet and venting valves are remotely controlled. When the sealant falls below a selected level, these valves are controlled automatically to restore the proper liquid level.

Thus, as long as the level of liquid in the indicator is monitored, the chances of the barrier liquid being depleted enough to break the shaft seal are minimized. Accordingly, there is little chance of gases escaping from the mixer tank into the space outside the tank.

BRIEF DESCRIPTION OF THE DRAWING

For a fuller understanding of the nature and objects of the invention, reference should be had to the following detailed description taken in connection with the accompanying Drawing which is a perspective view, with parts broken away and other parts shown diagrammatically, of a fluid-mechanical shaft sealing system made in accordance with this invention.

DESCRIPTION OF THE PREFERRED EMBODIMENT

Turning now to the drawing FIGURE, a rotary shaft assembly shown generally at 10 is mounted through a top opening 12 in a mixing tank 14. Assembly 10 includes a rotary shaft 16 whose upper end is connected to a suitable motor (not shown). Shaft 16 extends down into container 14 and carries a suitable mixing impeller (not shown) at its lower end.

Assembly 10 includes an inverted cup-shaped housing 18 having a flanged rim 18a. Housing 18 is secured to annular base plate 22 by means of bolts 24. The base plate 22 is, in turn, secured to the top wall of container 14 by means of bolts 26.

Shaft 16 is rotatively supported in part by a conventional shaft bearing shown generally at 28 and located at the upper end of housing 18. Also, the shaft assembly includes a conventional mechanical rotary shaft seal indicated at 32 just below bearing 28 inside housing 18. Seal 32 is comprised of a stationary ring 34 secured to housing 18 and through which shaft 16 extends with clearance. The lower annular face 34a of ring 34 constitutes a fixed bearing surface. The other seal member is fixed to rotate with shaft 16. The upper face 36a of the member 36 constitutes the other bearing surface. Conventionally, the surfaces 34a and 36a are lapped so that they have an extremely close surface-to-surface contact. Furthermore, these faces are spring-biased toward each other to maintain intimate contact between them when shaft 16 rotates.

As seen from the drawing, there is an annular space 42 between shaft 16 and base plate 22 which communicates with a similar space 44 between the shaft and its seal member 36 on the one hand and the wall of housing 18 on the other. The mechanical seal 32 suffices to prevent liquid from escaping from tank 14 through these spaces to the region outside assembly 10. Also, as long as there is a film of liquid between surfaces 34a and 36a, the seal 32 retards leakage of gases along these avenues of escape. However, as noted above, the seal might be adamaged by particles entrained in the gases.

Accordingly, assembly 10 also includes a liquid barrier unit shown generally at 48 which does prevent gas leakage. The barrier unit 48 includes an inner cup 52 coaxial with shaft 16. Cup 52 has a rim 52a that is fastened to the base plate 22. Shaft 16 extends down through an oversized opening 54 in the bottom 52b of the cup.

A second, larger diameter cup 58 is arranged to rotate with shaft 16 which extends through an opening 62 in the bottom wall 58a of the cup. A set screw 64 locks the cup to the shaft. Also, an O-ring 72 provides a liquid-tight seal between the shaft 16 and cup 58. The cup 58 extends up outside cup 52 so that its rim 58b is quite near the underside of base plate 22, creating a space 76 between the two cups.

A conduit 82 leading from a barrier liquid supply (not shown) extends through the wall of housing 18 into the space 44 between the housing wall and the shaft. A valve 84 is included in the conduit 82 to control the flow of liquid into the barrier unit. Normally, barrier liquid completely fills the spaces 42, 44 and 76 so that gases from within container 14 cannot pass through these spaces to the mechanical seal 32. Still, however, the shaft 16 and cup 58 are free to rotate relative to cup 52 and housing 18.

A conduit 86 extends through the housing wall 18 adjacent the mechanical seal 32 and communicates with space 44. Conduit 86 leads to a coil 88a in a heat exchanger 88. The other end of coil 88a is connected via a conduit 92 to a pump 94 whose outlet is connected to conduit 82 via a branch conduit 96. Thus, the barrier unit and the conduits 82, 86, 88, 92 and 96 form a closed, fluidtight loop around which the barrier liquid is circulated to cool it.

Conduit 86 also includes an upstanding stub branch 98 leading to the lower end of a sight glass 102. A vent 104 communicating with the upper end of the sight glass is normally closed by a valve 106.

When the system is filled initially, a slight pressure is provided in tank 14, e.g., 1–2 lbs. Then valve 84 is opened. Accordingly, barrier liquid flows into the barrier unit and the spaces therein. A minute or so after this, valve 106 is opened. Because of the positive tank pressure, the liquid is forced up into conduit 86 and sight glass 102, thereby displacing the air in these spaces which vents through valve 106. When the system is filled with barrier liquid, the level of liquid L in the sight glass is at the upper end of scale S. In other words, essentially all of the air previously in the system has been replaced by the liquid. At this point, the valve 106 is closed first and valve 84 is closed shortly thereafter to assure that barrier liquid has filled the cups 52 and 58. If some gas still remains in glass 102, first valve 106, then valve 84 may be cracked open momentarily to top off the glass 102 with barrier liquid.

As long as barrier unit 48 is filled with liquid, the level L remains at the same point in the sight glass 102. With prolonged operation of the mixer, however, some of the barrier liquid evaporates or may be thrown out of the cup 58. In conventional systems, this does not become immediately apparent. With the present system, however, as soon as the barrier liquid is depleted enough to allow gases to enter the system (i.e., its level falls below the bottom wall 52b of cup 52), the gases collect in the sight glass 102, it being the highest point in the circulation loop. This, in turn, results in a drop in the liquid level L in the sight glass. Immediately upon seeing this drop, the operator opens first valve 84 and then valve 106 to bring the liquid level L to the proper point on Scale S and thus refill the seal 48 as described above. This can be done before any appreciable amount of gas escapes from the tank 14. In this connection, it should be noted that seal 32 does retard gas leakage sufficiently to give the gas from container 14 an opportunity to migrate up the conduit 86 to the sight glass 102.

Thus, the present system provides a quick, sure technique for maintaining the integrity of a mechanical-fluid shaft sealing system. Furthermore, the present system can be implemented relatively easily for automatic operation. More particularly, the sight glass 102 may be supplemented with a conventional liquid level sensor indicated in dotted lines at 110 and the valves 84 and 106 may be hydraulic, pneumatic or other comparable remotely controlled valves. As soon as the liquid level falls below a determined value indicating insufficient liquid in the unit 48, the valves 84 and 106 are opened automatically and kept open until the proper liquid level is restored. Additionally, or alternatively, the sensor 110 might trigger an alarm to alert personnel to the situation.

Thus, while the present system improves the performance of fluid-mechanical shaft seals and minimizes the incidence of shutdown and failure, it does not add appreciably to the overall cost of the system. On the contrary, considering maintenance costs and downtime, it results in a more efficient and economical system.

I claim:

1. In a fluid shaft seal system employing a liquid barrier unit to carry pressurized barrier liquid forming a gastight seal between the shaft and its support, the improvement comprising an indicator positioned above the highest gravitational point of a fluid loop reentrant on said barrier unit and in fluid communication between an elevated portion of said loop and a normally closed valve which vents the indicator when the valve is open, said indicator being thereby positioned to receive barrier fluid from said loop when said valve is opened and to receive gas traveling through said loop from said barrier unit when said valve is closed, said gas displacing fluid from said indicator into said loop to thereby indicate a gas leak in said barrier unit.

2. The system defined in claim 10 wherein the unit is part of a closed loop including a heat exchanger and a pump so that the barrier liquid can be circulated around the loop for cooling purposes.

3. The system defined in claim 2 and further including means for connecting the unit to a barrier liquid supply so that additional liquid can be introduced into the unit when the indicating means indicates the existence of a leak and means for venting the system so as to remove any gas from the loop and indicating means.

4. The system defined in claim 3 wherein the connecting and venting means include remotely controlled valves and the indicating means is responsive to said drop of the barrier liquid level so as to automatically control the valves to maintain the proper amount of liquid in the unit.

5. The assembly defined in claim 10 wherein the indicator includes a sight glass by which the level of liquid in the chamber may be observed directly.

* * * * *